(12) United States Patent
Kurata et al.

(10) Patent No.: US 10,204,597 B2
(45) Date of Patent: *Feb. 12, 2019

(54) DISPLAY APPARATUS AND DISPLAY METHOD

(71) Applicant: SONY CORPORATION, Tokyo (JP)

(72) Inventors: Masatomo Kurata, Tokyo (JP); Yasuyuki Koga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,675

(22) Filed: Sep. 20, 2017

(65) Prior Publication Data

US 2018/0012568 A1  Jan. 11, 2018

Related U.S. Application Data

(63) Continuation of application No. 14/636,352, filed on Mar. 3, 2015, now Pat. No. 9,812,092.

(30) Foreign Application Priority Data

Mar. 12, 2014  (JP) ................. 2014-048335

(51) Int. Cl.
  *G09G 5/34* (2006.01)
  *G06F 3/0485* (2013.01)
(52) U.S. Cl.
  CPC .......... *G09G 5/343* (2013.01); *G06F 3/0485* (2013.01); *G09G 2354/00* (2013.01)
(58) Field of Classification Search
  CPC ... G06F 3/0485; G09G 5/343; G09G 2354/00
  See application file for complete search history.

(56) References Cited

U.S. PATENT DOCUMENTS

| 2010/0128121 | A1* | 5/2010 | Wilkinson | H04N 5/272 348/135 |
| 2011/0187681 | A1* | 8/2011 | Kim | G06F 1/1652 345/204 |
| 2013/0110264 | A1* | 5/2013 | Weast | G06F 19/3481 700/91 |

FOREIGN PATENT DOCUMENTS

JP  4272440 B2  3/2009

OTHER PUBLICATIONS

Notice of Allowance and Fees Due for U.S. Appl. No. 14/636,352, dated Jun. 30, 2017, 09 pages.
Non-Final Rejection for U.S. Appl. No. 14/636,352, dated Dec. 19, 2016, 14 pages.

* cited by examiner

*Primary Examiner* — Shaheda Abdin
(74) *Attorney, Agent, or Firm* — Chip Law Group (57) ABSTRACT

A display apparatus includes: a display unit configured to be able to be curved in an almost cylindrical shape with a surface being oriented outwards and display information in a region of one of an entire periphery and a part of the surface; a viewing intention detector configured to detect viewing intention of a user for the information displayed on the display unit, the user wearing the display unit on a part of a body; a display region determiner configured to determine, according to the viewing intention of the user, a region of the display unit, which is viewable by the user, as a display region for displaying the information; and a display control unit configured to control display of the information in the display region.

13 Claims, 11 Drawing Sheets

DISPLAY APPARATUS AND DISPLAY METHOD

CROSS REFERENCE TO RELATED APPLICATIONS

The present application is a continuation application of U.S. patent application Ser. No. 14/636,352, filed on Mar. 3, 2015, which claims benefit of priority from Japanese Patent Application 2014/048335, filed in the Japan Patent Office on Mar. 12, 2014, the entire contents of each of the above are hereby incorporated by reference.

BACKGROUND

The present technology relates to a display apparatus and a display method. In particular, the present technology relates to a display apparatus and a display method that enable a user to easily view information.

In recent years, apparatuses each wearable on a part of a human body have been proposed.

As one of such wearable apparatuses, there is a display apparatus. In the display apparatus, display of a display unit disposed on an arm portion of clothes is changed through a display changing means including a light receiver that detects light from a light emitter mounted on the head, for example (e.g., see Japanese Patent No. 4272440.

Many wristband type display apparatuses each including a display unit disposed on a part of the wristband have been proposed.

SUMMARY

By the way, when the user wears the wristband type display apparatus, the wristband needs to be fitted on the arm (wrist) with some force. This is cumbersome and sometimes imposes a burden on the user.

In view of this, considering a device wearable in a loose-fitting manner such that the wristband does not press the wrist, the burden on the user can be reduced. However, in this case, there is a fear that the display unit may be moved (rotated) to be hidden from the user.

In view of the above-mentioned circumstances, it is desirable to enable a user to easily view information without imposing a burden on the user.

According to an embodiment of the present technology, there is provided a display apparatus including: a display unit configured to be able to be curved in an almost cylindrical shape with a surface being oriented outwards and display information in a region of one of an entire periphery and a part of the surface; a viewing intention detector configured to detect viewing intention of a user for the information displayed on the display unit, the user wearing the display unit on a part of a body; a display region determiner configured to determine, according to the viewing intention of the user, a region of the display unit, which is viewable by the user, as a display region for displaying the information; and a display control unit configured to control display of the information in the display region.

The viewing intention detector may be configured to detect an attitude of the user, to thereby detect the viewing intention of the user.

The display region determiner may be configured to determine, based on the attitude of the user, the region of the display unit, which is viewable by the user, as the display region.

The viewing intention detector may be configured to detect the viewing intention of the user according to an operation input made by the user.

The display region determiner may be configured to determine the display region according to an operation input with respect to a touch panel superimposed on the display unit.

The display control unit may be configured to continuously scroll, in the display region, the information in a circumferential direction of the display unit.

The display control unit may be configured to slide-display, in the display region, the information in predetermined time intervals.

The display control unit may be configured to perform control to collectively display, in the display region, the information such that all the information is contained within the display region.

The display control unit may be configured to perform control to scroll, in the display region, the information in a circumferential direction of the display unit according to an operation input with respect to a touch panel superimposed on the display unit.

The display control unit may be configured to change, according to an action of the user, a method of displaying the information displayed on the display unit.

The display apparatus may further include a rotation detector configured to detect a rotation of the display unit in a circumferential direction, in which the display region determiner may be configured to move the display region according to an angle of rotation detected by the rotation detector, and the display control unit may be configured to control display of the information according to the movement of the display region.

If the rotation detector detects a rotation by one turn from an initial state, the display control unit may be configured to perform control to display a continuation of the information in the display region at a position of the initial state.

If the rotation detector detects a rotation by a predetermined angle from an initial state and further detects an inverse rotation to the initial state, the display region determiner may be configured to return the display region moved according to the rotation to a position of the initial state, and the display control unit may be configured to perform control to display a continuation of the information in the display region at the position of the initial state.

The display control unit may be configured to control display of one of a predetermined image and a predetermined color in a region other than the display region of the display unit.

The display control unit may be configured to control, if the user has no viewing intention for the information, display of one of a predetermined image and a predetermined color in one of an entire periphery and a part of the display unit.

According to an embodiment of the present technology, there is provided a display method for a display apparatus including a display unit configured to be able to be curved in an almost cylindrical shape with a surface being oriented outwards and display information in a region of one of an entire periphery and a part of the surface, the display method including: by the display apparatus, detecting viewing intention of a user for the information displayed on the display unit, the user wearing the display unit on a part of a body; determining, according to the viewing intention of the user, a region of the display unit, which is viewable by the user, as a display region for displaying the information; and controlling display of the information in the display region.

In the embodiment of the present technology, the viewing intention of the user wearing the display unit on the part of the body for the information displayed on the display unit is detected. According to the viewing intention of the user, the region of the display unit, which is viewable by the user, is determined as the display region in which the information is displayed. The display of the information in the display region is controlled.

According to an embodiment of the present technology, it is possible to enable a user to easily view information without imposing a burden on the user.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present technology will be described with reference to the drawings.
[Outer Appearance View of Display Apparatus]

Figure 1:
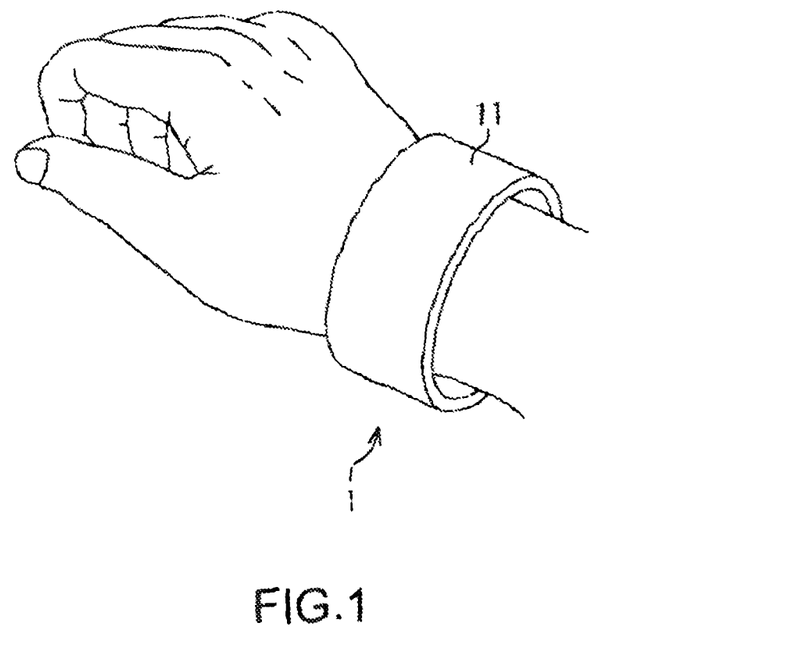
FIG. 1 is an outer appearance view showing a configuration example of a display apparatus according to an embodiment to which the present technology is applied.

FIG. 1 is an outer appearance view showing a configuration example of a wristband type display apparatus according to an embodiment to which the present technology is applied.

For example, a display apparatus 1 of FIG. 1 is made of resin, formed in a hollow cylindrical shape, and mounted on an arm (wrist) as a part of a human body. The display apparatus 1 does not expand and contract by itself. Therefore, for wearing the display apparatus 1, the user closes a palm and inserts a hand into the display apparatus 1 from finger tops to the wrist. In a state in which the user wears the display apparatus 1 on the wrist, the display apparatus 1 is movable (rotatable) around the wrist.

On an outer peripheral surface of the display apparatus 1, a display unit 11 is at an entire periphery thereof disposed. The display unit 11 is able to be curved in a cylindrical shape with a surface being oriented outwards and display information in a region of an entire periphery or a part of the surface. A thin flexible display formed of, for example, organic electro luminescence (EL) or electronic paper is used as the display unit 11.

Alternatively, a touch panel may be superimposed on the display unit 11. The touch panel receives an input of contact (press) of a finger of the user or a stylus pen.

Note that the cylinder of the display apparatus 1 contains a microchip for controlling display of the display unit 1 and a memory that stores information displayed on the display unit 1.
[Functional Configuration Example of Display Apparatus]

Figure 2:
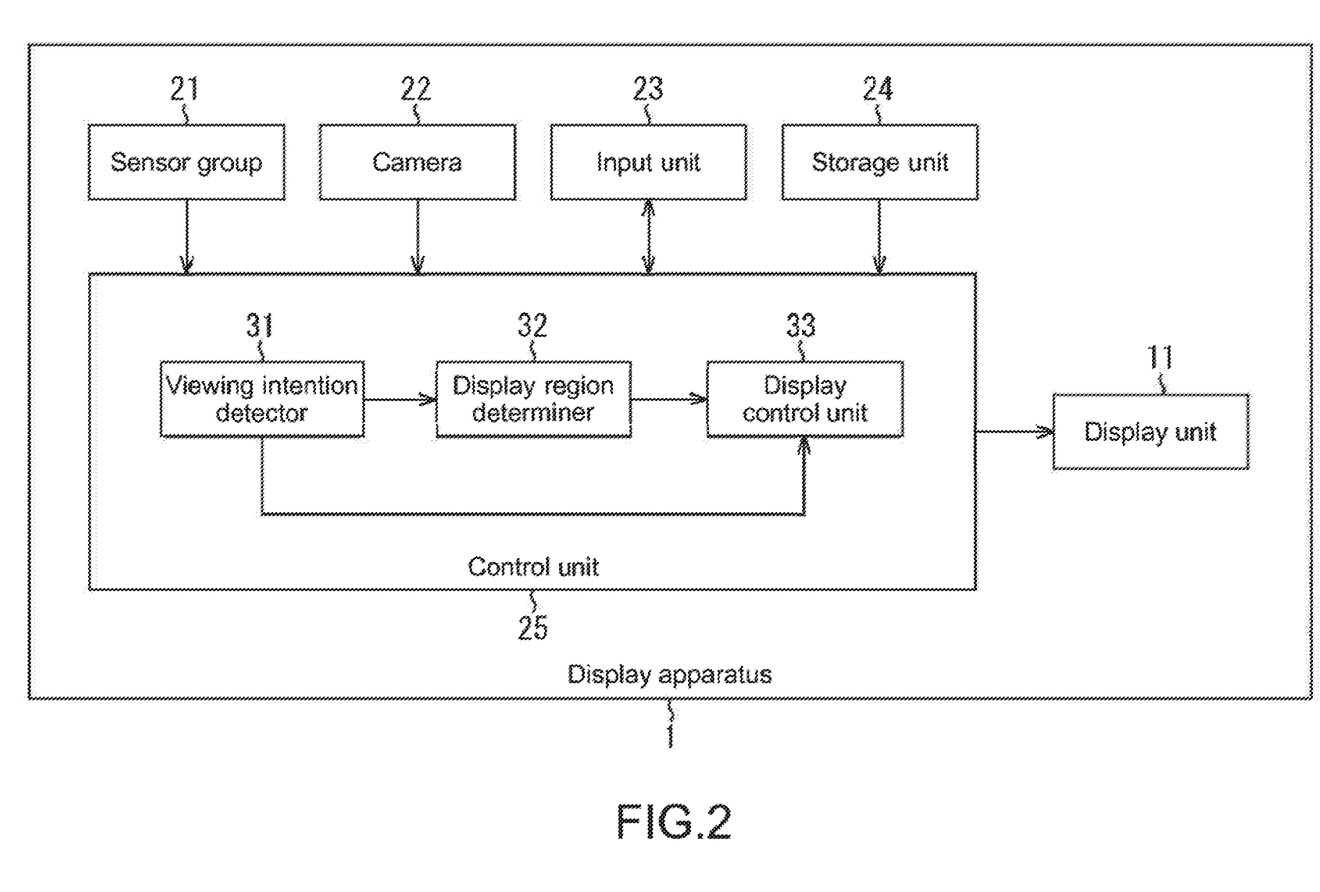
FIG. 2 is a block diagram showing a functional configuration example of the display apparatus.

FIG. 2 is a block diagram showing a functional configuration example of the display apparatus 1.

In addition to the display unit 11 described with reference to FIG. 1, the display apparatus 1 includes a sensor group 21, a camera 22, an input unit 23, a storage unit 24, and a control unit 25.

The sensor group 21 includes an acceleration sensor, a gyro sensor, a geomagnetic sensor, and the like. These sensors supply outputs to the control unit 25.

The camera 22 is configured as a miniature pinhole camera. A plurality of cameras 22 are disposed on an outer peripheral surface of the display unit 11. The plurality of cameras 22 supply imaging results to the control unit 25.

Other than the above-mentioned touch panel superimposed on the display unit 11, the input unit 23 is configured as a physical button disposed on a side surface of the display apparatus 1 (end surface of cylinder), for example. The input unit 23 receives an operation input made by the user and supplies operation information corresponding to the operation input to the control unit 25.

The storage unit 24 stores various types of information used for display control of the display unit 11 besides information for display (hereinafter, referred to as display information) such a text and an image displayed on the display unit 11. The information stored in the storage unit 24 is read by the control unit 25 if necessary. Note that the display apparatus 1 may be provided with a communication unit such that the information stored in the storage unit 24 can be supplied to the display apparatus 1 from an external apparatus via a network.

The control unit 25 performs control of display on the display unit 11. Specifically, based on any one of outputs from the sensor group 21, imaging results from the cameras 22, and operation information from the input unit 23, the control unit 25 controls display of the display information read from the storage unit 24 on the display unit 11.

The control unit 25 includes a viewing intention detector 31, a display region determiner 32, and a display control unit 33.

Based on any one of the outputs from the sensor group 21, the imaging results from the cameras 22, and the operation information from the input unit 23, the viewing intention detector 31 detects viewing intention of the user wearing the display apparatus 1 (display unit 11) for the display information displayed on the display unit 11 (whether or not the user intends to view the display information). Then, the viewing intention detector 31 supplies the detection result (viewing intention of user) to the display region determiner 32 or the display control unit 33.

According to the viewing intention of the user from the viewing intention detector 31, the display region determiner 32 determines the region of the display unit 11, which is viewable by the user, as the display region in which the display information from the storage unit 24 is displayed.

Figure 3:
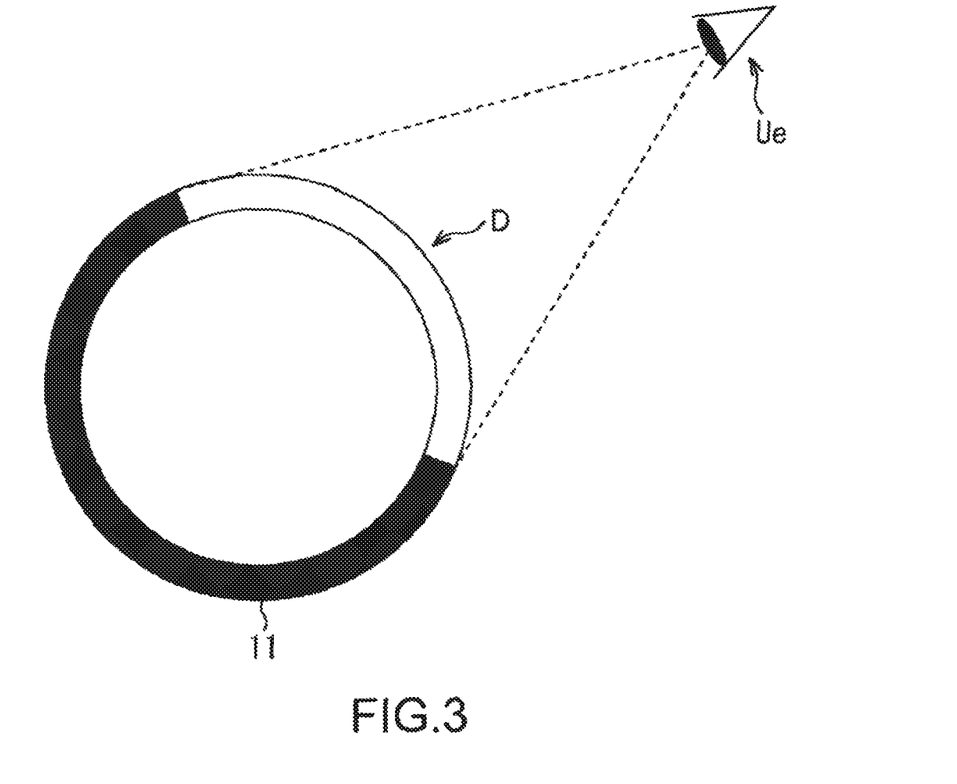
FIG. 3 is a view explaining a display region.

That is, if the user has viewing intention (the user intends to view information), for example, as shown in FIG. 3, a region D of the display unit 11, which is in a field of view of a user's eye Ue (outlined part in figure), is determined as the display region.

The display region determiner 32 supplies display region information indicating the determined display region to the display control unit 33.

When receiving the display region information from the display region determiner 32, the display control unit 33 controls display of the display information from the storage unit 24 in the display region of the display unit 11 which is indicated by the display region information. When receiving the detection result (viewing intention of user) from the viewing intention detector 31, the display control unit 33 controls display in the region of the entire periphery or part of the display unit 11.

[Information Display Processing by Display Apparatus]

Next, referring to a flowchart of FIG. 4, information display processing performed by the display apparatus 1 will be described.

Figure 4:
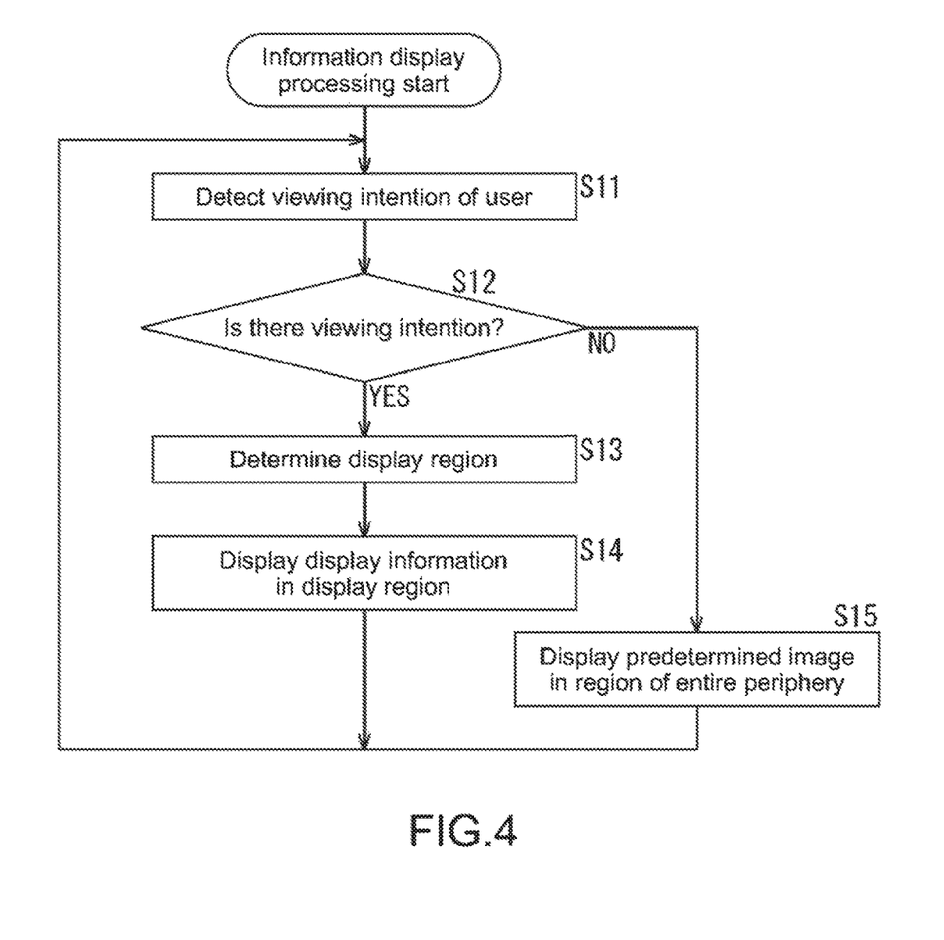
FIG. 4 is a flowchart explaining information display processing.

Note that the information display processing of FIG. 4 starts after judgment as to which of left and right arms of the user the display apparatus 1 is mounted on.

For example, the control unit 25 judges which of the left and right arms the display apparatus 1 is mounted on through pattern recognition using outputs of the acceleration sensor and gyro sensor forming a part of the sensor group 21 during walking. Here, it is assumed that data used for the pattern recognition is obtained by learning and stored in the storage unit 24 in advance.

Alternatively, a vein sensor capable of capturing a vein pattern of the wrist region of the user may be disposed on an inner peripheral surface of the display apparatus 1 as the sensor group 21 and which of the left and right arms the display apparatus 1 is mounted on may be judged through pattern recognition using the vein pattern.

Note that, through an operation input made by the user with respect to the touch panel or button provided as the input unit 23, either one of the left and right arms on which the display apparatus 1 is mounted may be set.

Thus, which of the left and right arms of the user the display apparatus 1 is mounted on is judged. Then, in Step S11, the viewing intention detector 31 of the control unit 25 detects the viewing intention of the user wearing the display apparatus 1.

For example, the viewing intention detector 31 detects an attitude of the user to judge whether or not the user has taken an attitude of trying to view display information displayed on the display unit 11 (attitude similar to that of trying to consult a watch). In this manner, the viewing intention detector 31 detects the viewing intention of the user.

Specifically, the viewing intention detector 31 detects the attitude of the user by estimating a three-dimensional state of the display apparatus 1 (change in position or tilt in three-dimensional space) based on an output of the acceleration sensor, gyro sensor, or geomagnetic sensor forming a part of the sensor group 21. Note that attitudes of the user, that is, three-dimensional states of the sensors may be obtained by leaning and stored in the storage unit 24 in advance and thus the attitude of the user may be detected by the pattern recognition.

Alternatively, the viewing intention detector 31 may perform a line-of-sight detection or face detection of the user, using images captured by the cameras 22, to thereby detect the attitude of the user.

By thus detecting the attitude of the user, the viewing intention detector 31 detects the viewing intention of the user.

Still alternatively, the viewing intention detector 31 may detect the viewing intention of the user according to an operation input made by the user with respect to the touch panel or button provided as the input unit 23.

In Step S12, the viewing intention detector 31 judges whether or not the user has the viewing intention for the display information displayed on the display unit 11, in other words, whether or not the user has taken an attitude of trying to view the information of the display unit based on the result of detection of Step S11.

If it is judged in Step S12 that the user has the viewing intention, the viewing intention detector 31 supplies the result of detection indicating the fact that the user has the viewing intention, to the display region determiner 32, and the processing proceeds to Step S13.

Until whether or not the user has the viewing intention is judged, an operation input with respect to the touch panel provided as the input unit 23 may be invalidated. If it is judged that the user has the viewing intention, the operation input with respect to the touch panel may be validated.

In Step S13, the display region determiner 32 determines the display region of the display unit 11 based on the result of detection from the viewing intention detector 31.

For example, based on the attitude of the user detected by the viewing intention detector 31 using the output of the acceleration sensor, gyro sensor, or geomagnetic sensor forming a part of the sensor group 21, the display region determiner 32 estimates a region of the display unit 11 mounted on the wrist of the user, which is a region of the back of the hand, a region closer to the face, or a region opposite to a region facing the ground, and determines this region as the display region.

Alternatively, the display region determiner may estimate a region of the display unit 11, which corresponds the wrist of the user on a front side of the palm, using the vain pattern of the wrist region of the user that is captured by the vein sensor forming a part of the sensor group 21, and determine a region opposite to this region as the display region.

Still alternatively, the display region determiner 32 may perform a line-of-sight detection or face detection of the user, using images captured by the plurality of cameras 22 disposed on the outer peripheral surface of the display unit 11, to thereby determine a region of the display unit 11, which faces the face of the user, as the display region.

Figure 5:
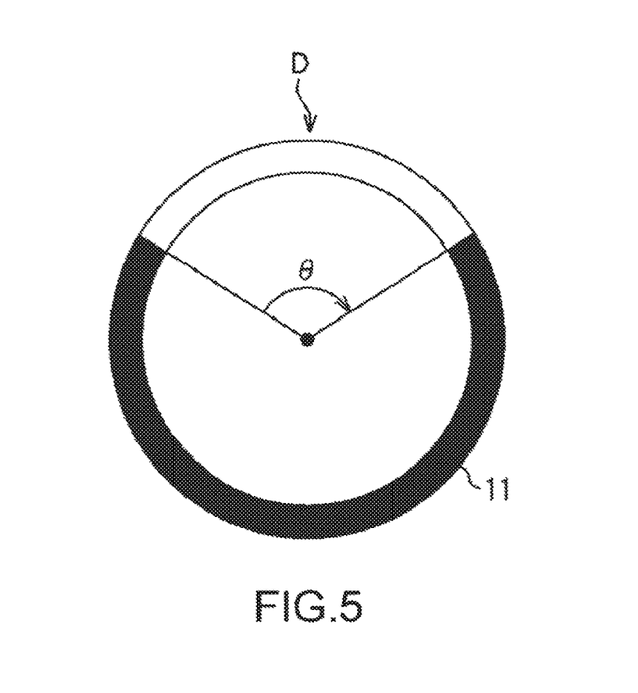
FIG. 5 is a view explaining determination of the display region.

Note that, as described above, when the region of the display unit 11, which is viewable by the user, is determined as the display region, the region D corresponding to a circular arc defined by an angle θ set by the user in advance may be determined as the display region as shown in FIG. 5.

Figure 6:
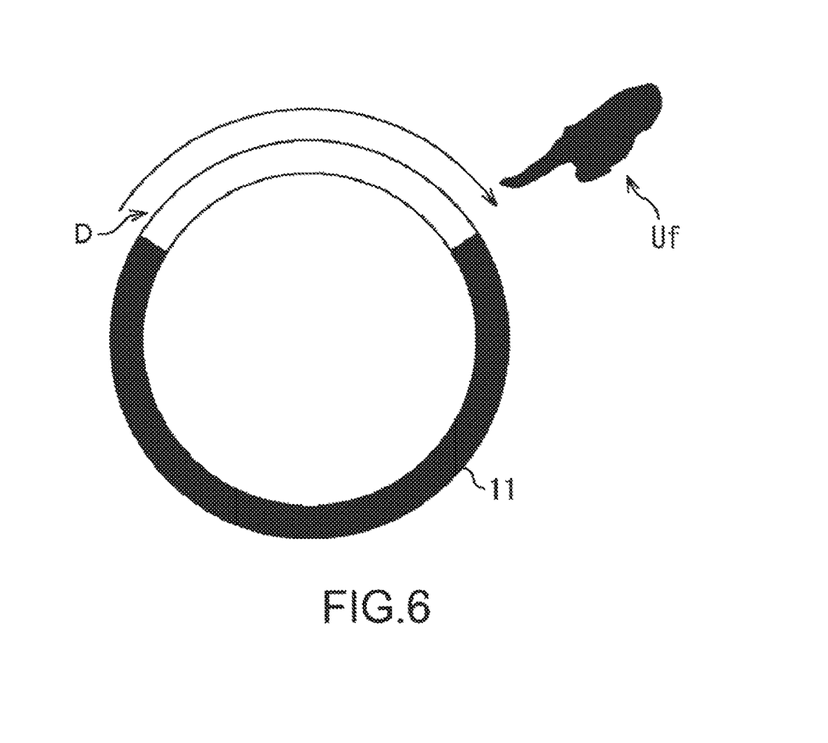
FIG. 6 is a view explaining the determination of the display region.

Alternatively, the display region determiner 32 may determine the display region through an operation input made by the user with respect to the touch panel or button provided as the input unit 23. Specifically, as shown in FIG. 6, the region D of the display unit 11, which has been traced with a user's finger Uf, may be determined as the display region or a region in a predetermined range with a point touched by the user's finger Uf being a center may be determined as the display region.

In particular, when the user tries to check the display unit 11, lying on his or her back, the region of the display unit 11 that is opposite to the region facing the ground is hidden from the user, and hence the determination of the display region through the operation input with respect to the touch panel is effective.

The display region determiner 32 supplies the display region information indicating the display region determined in the above-mentioned manner to the display control unit 33.

Referring back to the flowchart of FIG. 4, in Step S14, the display control unit 33 performs control to display the display information from the storage unit 24 in the display region indicated by the display region information from the display region determiner 32.

Specifically, the display control unit 33 performs control to continuously scroll text data as the display information in the display region of the display unit 11 in a circumferential direction of the display unit 11.

Alternatively, the display control unit 33 may perform control to slide-display the text data as the display information in the display region of the display unit 11 by a predetermined amount, for example, in predetermined time intervals, for example, five seconds.

Still alternatively, the display control unit 33 may perform control to collectively display text data items in the display region of the display unit 11 such that all text data items as the display information is contained within the display region of the display unit 11.

Still alternatively, the display control unit 33 performs control to continuously scroll the text data items in the display region of the display unit 11 in the circumferential direction of the display unit 11 according to an operation input made by the user with respect to the touch panel provided as the input unit 23.

Still alternatively, the display control unit 33 may change, according to an action of the user, a method of displaying the text data as the display information displayed in the display region of the display unit 11.

Specifically, the display control unit 33 increases the size of characters in a text displayed in the display region of the display unit 11 while the user is running and reduces the size of characters in the text displayed in the display region of the display unit 11 while the user is standing. While the user is driving a car, the text displayed in the display region of the display unit 11 may be output as speech. Note that the actions of the user, for example, running, standing, and driving a car can be recognized using the acceleration sensor or gyro sensor forming a part of the sensor group 21.

Note that the display control unit 33 can also perform control to display a predetermined image, color, or the like in a region other than the display region of the display unit 11.

On the other hand, in Step S12, if it is judged that the user does not have the viewing intention, the viewing intention detector 31 supplies the result of detection indicating the fact that the user does not have the viewing intention, to the display control unit 33, and the processing proceeds to Step S15.

In Step S15, the display control unit 33 performs control to display the predetermined image, color, or the like in the region of the entire periphery of the display unit 11.

Examples of those displayed in the region of the entire periphery of the display unit 11 include an image of a design imitating an accessary and advertisement and message that can be recognized by surrounding people. Note that the region of the display unit 11 in which the predetermined image or color is displayed is not limited to the region of the entire periphery of the display unit 11 and may be, for example, a partial region of the display unit 11, for example, a region of the display unit 11 on the back side of the hand of the user.

Alternatively, if it is judged that the user does not have the viewing intention, nothing may be displayed in the region of the entire periphery of the display unit 11. After Step S14 or S15, the processing returns to Step S11.

According to the above-mentioned processing, even if the wristband type display apparatus mounted on the wrist of the user in a loose-fitting manner is moved (rotated) around the wrist, the display information is displayed in the region of the display unit, which is viewable by the user. Therefore, it is possible to enable the user to easily view the information without imposing a burden on the user.

As described above, the wristband type display apparatus to which the present technology is applied is mounted on the wrist of the user in a loose-fitting manner. Therefore, the user can voluntarily rotate the display apparatus around the wrist. Thus, the display region of the display unit may be moved according to the rotation of the display apparatus.

[Other Functional Configuration Examples of Display Apparatus]

Figure 7:
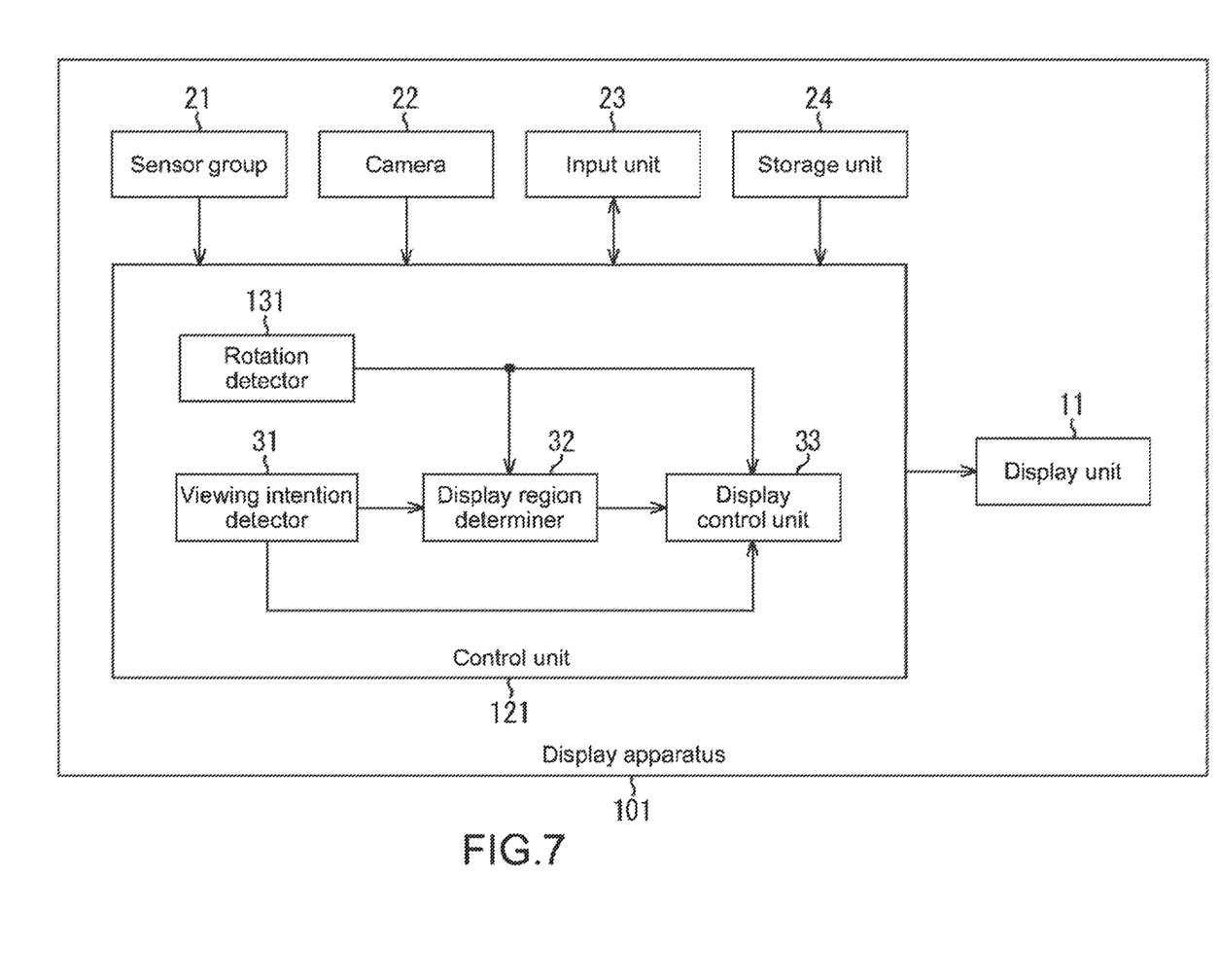
FIG. 7 is a block diagram showing a functional configuration example of a display apparatus.

FIG. 7 is a block diagram showing a functional configuration example of a wristband type display apparatus configured such that a display region is moved according to the rotation of the display apparatus.

Note that, in a display apparatus 101 of FIG. 7, portions having the same functions as those of the display apparatus 1 of FIG. 2 will be denoted by the same reference symbols and descriptions thereof will be appropriately omitted.

That is, a display apparatus 101 of FIG. 7 is different from the display apparatus 1 of FIG. 2 in that the control unit 25 is replaced by a control unit 121. The control unit 121 of FIG. 7 is different from the control unit 25 of FIG. 2 in that a rotation detector 131 is newly added to the control unit 121.

Based on an output from the gyro sensor or geomagnetic sensor as the sensor group 21, the rotation detector 131 detects a rotation of the display apparatus 101 (display unit 11) in a circumferential direction. The rotation detector 131 supplies angle information indicating an angle by which the display apparatus 101 has been rotated, to the display region determiner 32 and the display control unit 33.

Then, the display region determiner 32 moves the display region of the display unit 11 according to the rotation angle indicated by the angle information from the rotation detector 131. The display control unit 33 controls display of the display information displayed in the display region according to the rotation angle indicated by the angle information from the rotation detector 131 (in other words, the movement of the display region of the display unit 11).

[Example 1 of Display Region Moving Processing by Display Apparatus]

Next, referring to a flowchart of FIG. 8, an example of display region moving processing by the display apparatus 101 will be described.

Figure 8:
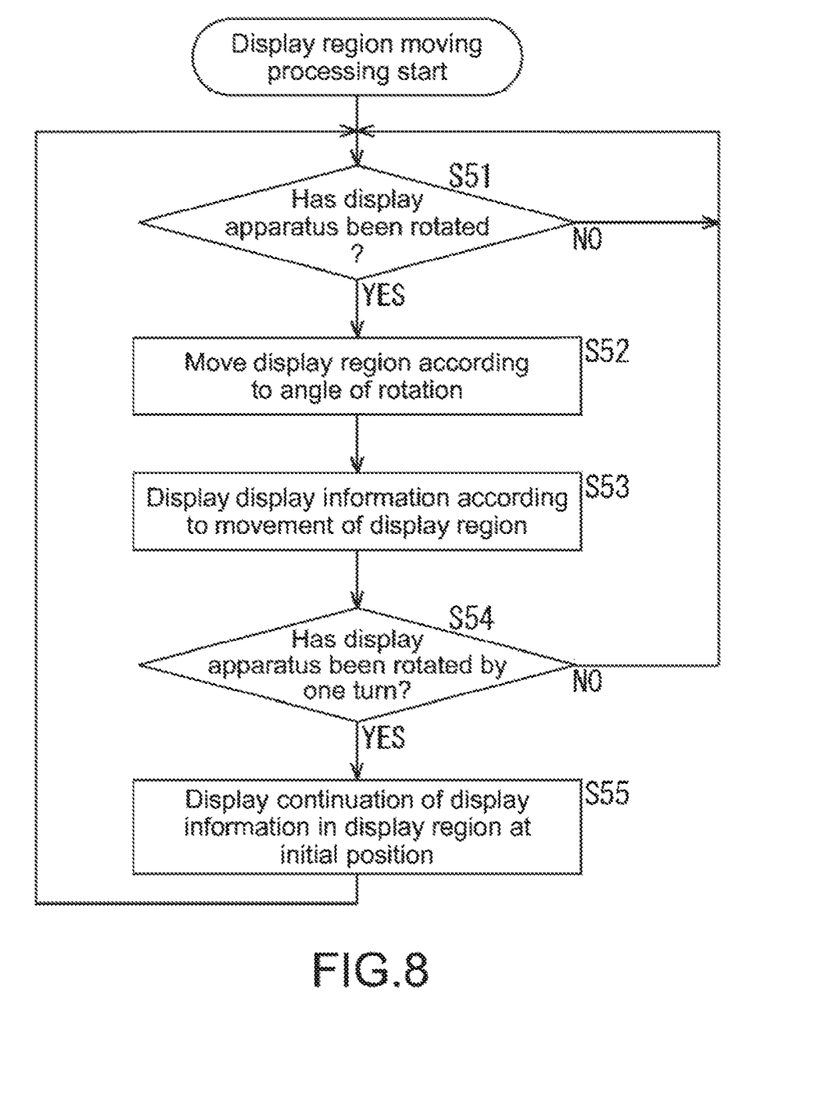
FIG. 8 is a flowchart explaining display region moving processing.

It is assumed that the display region moving processing of FIG. 8 is started in a state in which the display information is displayed in the display region in Step S14 of the information display processing of FIG. 4. Note that the three-dimensional state of the display apparatus 101 at this time is defined as an initial state.

In Step S51, the rotation detector 131 judges, based on an output from the sensor group 21, whether or not the display apparatus 101 has been rotated in the circumferential direction from the initial state.

Until it is judged that the display apparatus 101 has been rotated in the circumferential direction from the initial state, the processing of Step S51 is repeated. If it is judged that the display apparatus 101 has been rotated in the circumferential direction from the initial state, the rotation detector 131 supplies angle information indicating an angle by which the display apparatus 101 has been rotated, to the display region determiner 32 and the display control unit 33, and the processing proceeds to Step S52.

In Step S52, the display region determiner 32 moves the display region of the display unit 11 according to the rotation angle indicated by the angle information from the rotation detector 131.

In Step S53, the display control unit 33 performs control to display the display information in the moved display region according to the movement of the display region of the display unit 11.

In Step S54, the rotation detector 131 judges, based on an output from the sensor group 21, whether or not the display apparatus 101 has been rotated by one turn from the initial state.

Until it is judged that the display apparatus 101 has been rotated by one turn from the initial state, the processing of Steps S51 to S54 is repeated. If it is judged that the display apparatus 101 has been rotated by one turn from the initial state, the rotation detector 131 supplies information indicating the fact that the display apparatus 101 has been rotated by one turn from the initial state, to the display control unit 33, and the processing proceeds to Step S55.

In Step S55, the display control unit 33 performs control to a continuation of the information in the display region at a position of the initial state.

Now, referring to FIGS. 9A, 9B and 9C, the movement of the display region according to the above-mentioned rotation of the display apparatus 101 will be described. On the left-hand side of FIGS. 9A, 9B and 9C, simple side views of the display apparatus 101 are shown. On the right-hand side of FIGS. 9A, 9B and 9C, states of the movement of the display region of the display unit 11 are shown. It is assumed that a part of the text "Today, the weather will be clear, followed by clouds later on, and occasionally rainy in some areas. It will be seasonably warm . . . " is displayed in the display region.

Figure 9A:
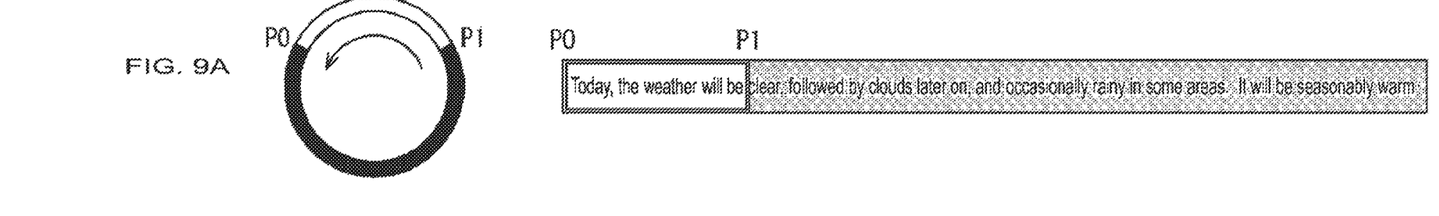
FIGS. 9A, 9B and 9C are views explaining movements of a display region.

FIG. 9A shows the initial state of the display apparatus 101. The display region is a region of the display unit 11, which is defined by points P0 to P1. Hereinafter, the region defined by the points P0 to P1 will be referred to as a region P0-P1 or the like. Further, in the initial state of FIG. 9A, the part "Today, the weather will be" of the entire text is displayed in the region P0-P1 as the display region.

Figure 9B:
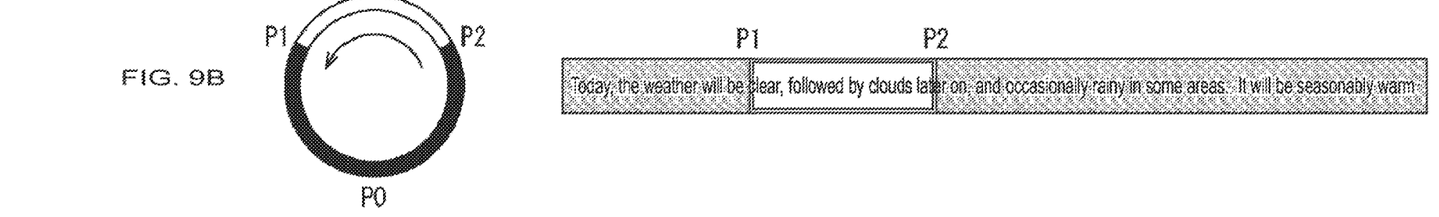

When the display apparatus 101 is rotated in a left-hand direction (counter-clockwise direction) in the figure from the initial state on the left-hand side of FIG. 9A, the display region is, according to the rotation, moved as if it were fixed from the viewpoint of the user and comes to a position of a region P1-P2 shown on the left-hand side of FIG. 9B. As shown in the right-hand side of FIG. 9B, the part "clear, followed by clouds lat" of the entire text is displayed in the region P1-P2 as the display region.

Figure 9C:
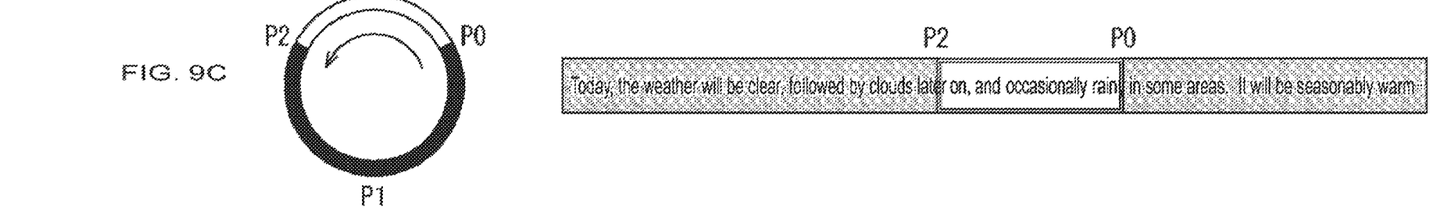

When the display apparatus 101 is rotated in the left-hand direction (counter-clockwise direction) in the figure from the state on the left-hand side of FIG. 9B, the display region is, according to the rotation, moved as if it were fixed from the viewpoint of the user and comes to a position of a region P2-P0 shown on the left-hand side of FIG. 9C. As shown in the right-hand side of FIG. 9C, the part "er on, and occasionally rain" of the entire text is displayed in the region P2-P0 as the display region.

That is, the text is displayed in the display region as if a relative position of the display unit 11 and the text displayed on the display unit 11 were fixed.

Moreover, when the display apparatus 101 is rotated in the left-hand direction (counter-clockwise direction) in the figure from the state on the left-hand side of FIG. 9C and the display apparatus 101 is rotated by one turn from the initial state, the display region returns to the position of the region P0-P1 shown on the left-hand side of FIG. 9A. Then, the part "y in some areas. It will be seasonably warm . . . " that is a continuation of the part "er on, and occasionally rain" is displayed in the region P0-P1 as the display region.

Referring back to the flowchart of FIG. 8, after Step S55, the processing returns to Step S51 and the above-mentioned processing is repeated. In this manner, by rotating the display apparatus around the wrist, the user can check the display information displayed according to the rotation.

In accordance with the above-mentioned processing, by the user rotating the wristband type display apparatus mounted in a loose-fitting manner around the wrist, the display information is displayed in the region of the display unit, which is viewable by the user. Therefore, it is possible to enable the user to easily view information without imposing a burden on the user.

[Example 2 of Display Region Moving Processing by Display Apparatus]

Next, referring to a flowchart of FIG. 10, another example of the display region moving processing by the display apparatus 101 will be described.

Figure 10:
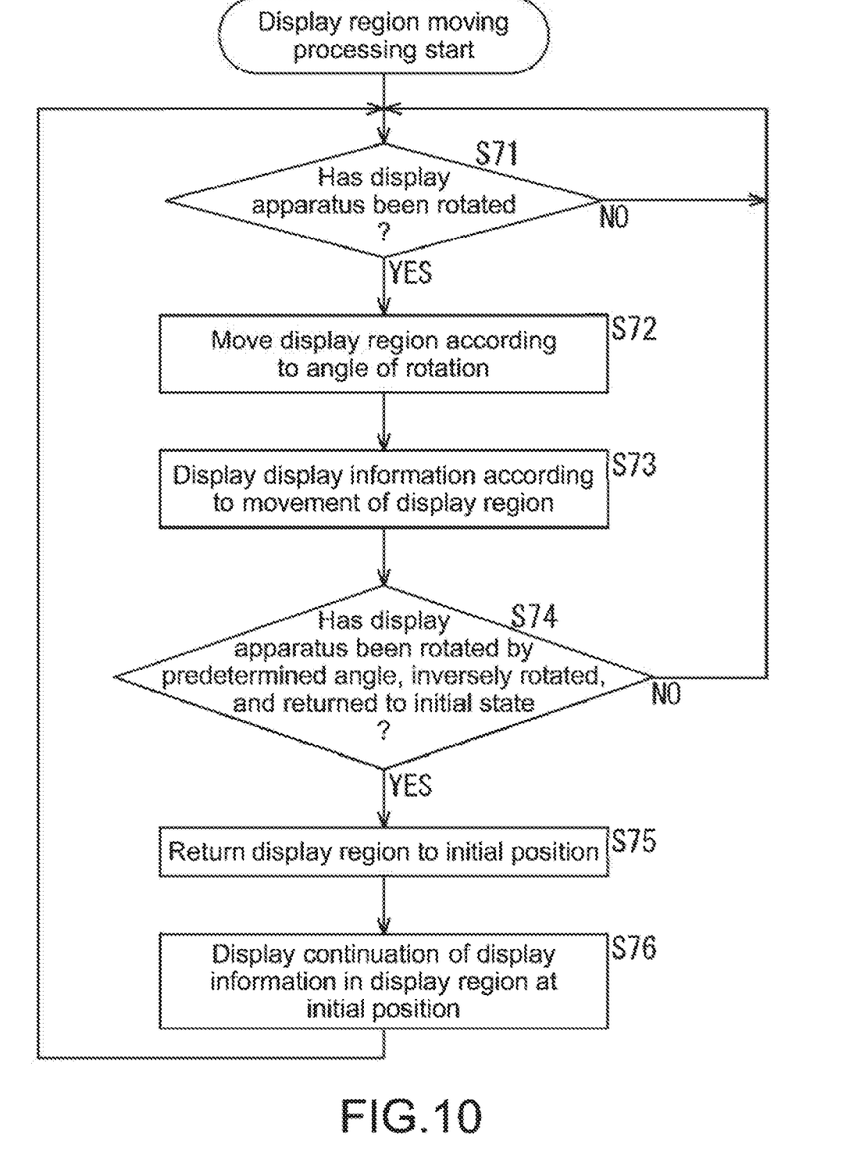
FIG. 10 is a flowchart explaining display region moving processing.

It is assumed that the display region moving processing of FIG. 10 also starts in the state in which the information is displayed in the display region in Step S14 of the information display processing of FIG. 4. Note that the three-dimensional state of the display apparatus 101 at this time is defined as the initial state.

Further, processing of Steps S71 to S73 in the flowchart of FIG. 10 is the same as the processing of Steps S51 to S53 in flowchart of FIG. 8, and hence a description thereof will be described.

That is, in Step S74, the rotation detector 131 judges, based on an output from the sensor group 21, whether or not the display apparatus 101 has been rotated by a predetermined angle from the initial state and inversely rotated and has returned to the initial state.

Until it is judged that the display apparatus 101 has been rotated by the predetermined angle from the initial state and inversely rotated and has returned to the initial state, the processing of Steps S71 to S74 is repeated.

If it is judged that the display apparatus 101 has been rotated by the predetermined angle from the initial state and inversely rotated and has returned to the initial state, the rotation detector 131 supplies information indicating the fact that the display apparatus 101 has been rotated by the predetermined angle from the initial state and inversely rotated and has returned to the initial state to the display control unit 33. Then, the processing proceeds to Step S75.

In Step S75, the display region determiner 32 returns the display region to a position of the initial state (initial position).

Then, in Step S76, the display control unit 33 performs control to display a continuation of information in the display region at a position of the initial state.

Now, referring to FIGS. 11A, 11B and 11C, the movement of the display region according to the rotation of the display apparatus 101 will be described. As in FIGS. 9A, 9B and 9C, on the left-hand side of FIGS. 11A, 11B and 11C, simple side views of the display apparatus 101 are shown. On the right-hand side of FIGS. 11A, 11B and 11C, states of the movement of the display region of the display unit 11 are shown.

Figure 11A:
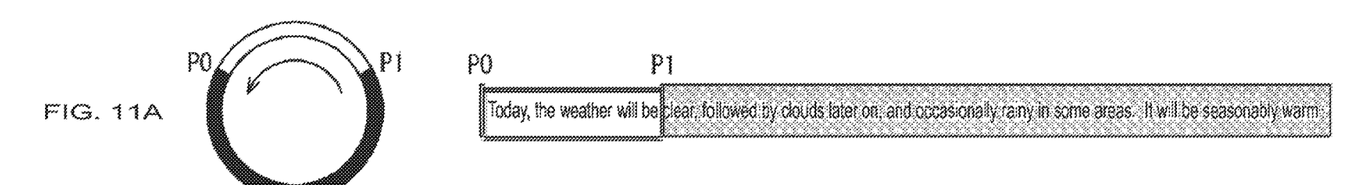
FIGS. 11A, 11B and 11C are views explaining movements of a display region.

FIG. 11A shows the initial state of the display apparatus 101 and the region P0-P1 of the display unit 11 is defined as the display region. Further, in the initial state of FIG. 11A, the part "Today, the weather will be" of the entire text is displayed in the region P0-P1 as the display region.

Figure 11B:
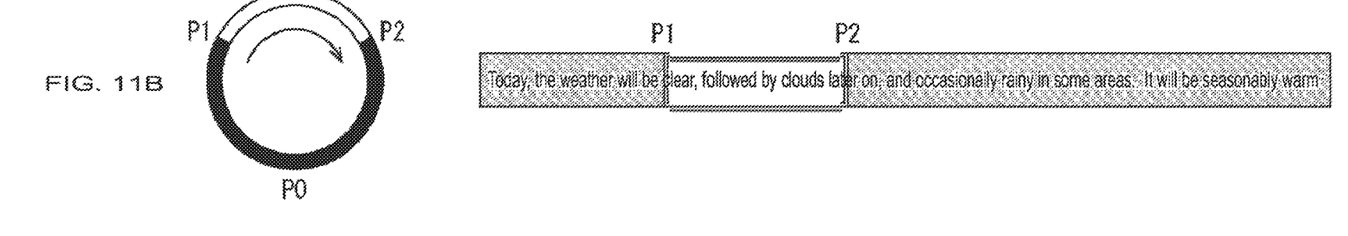

When the display apparatus 101 is rotated in the left-hand direction (counter-clockwise direction) in the figure from the initial state on the left-hand side of FIG. 11A, the display region is, according to the rotation, moved as if it were fixed from the viewpoint of the user and comes to the position of the region P1-P2 shown on the left-hand side of FIG. 11B. As shown on the right-hand side of FIG. 11B, the part "clear, followed by clouds lat" of the entire text is displayed in the region P1-P2 as the display region.

Figure 11C:
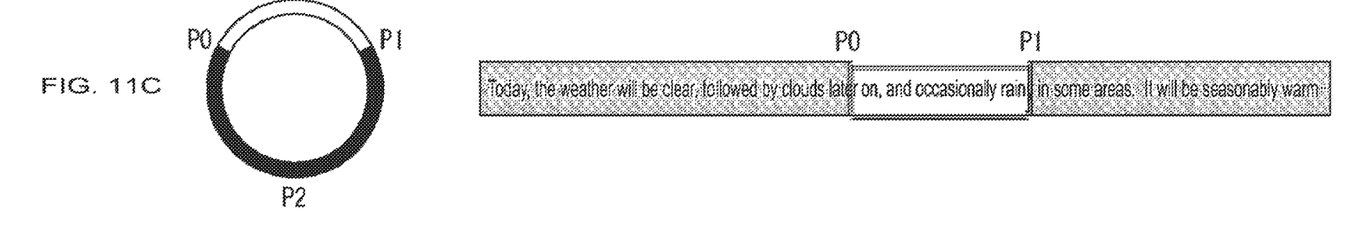

When the display apparatus 101 is rotated in a right-hand direction (clockwise direction) in the figure from the state on the left-hand side of FIG. 11B, the display region returns to a position of the region P0-P1 shown on the left-hand side of FIG. 11C. As shown on the right-hand side of FIG. 11C, the part "er on, and occasionally rain" that is a continuation of the part "clear, followed by clouds lat" is displayed in the region P0-P1 as the display region.

Referring back to the flowchart of FIG. 10, after Step S75, the processing returns to Step S71 and the above-mentioned processing is repeated. In this manner, by rotating the display apparatus around the wrist, the user can check the display information displayed according to the rotation.

In accordance with the above-mentioned processing, by the user moving (rotating) the wristband type display apparatus mounted in a loose-fitting manner around the wrist, the display information is displayed in the region of the display unit, which is viewable by the user. Therefore, it is possible to enable the user to easily view information without imposing a burden on the user.

When an operation input by a single touch is performed as the operation input made by the user with respect to the touch panel provided as the input unit 23 in the state in which the display information is displayed in the display region of the display unit 11, the display information may be continuously scrolled with the display region of the display unit 11 being fixed. When an operation input by a multi-touch is performed, the display region may be moved and the display information may be displayed according to the rotation of the display unit 11 as described with reference to FIGS. 8 to 11.

[Application Examples]

Hereinafter, application examples applied to the display apparatus according to the embodiment of the present technology will be described.

(1) Text Display Application

An application for displaying a text of a mail or a tweet in a social network service (SNS) can be applied to the display apparatus according to the embodiment of the present technology. In particular, in the case where many words are displayed, scroll and display according to the operation input made by the user with respect to the touch panel or the movement and display of the display region according to the rotation of the display unit 11 described with reference to FIGS. 8 to 11 are performed. Note that, in the display unit 11, not only the text display but also text input may be possible. Specifically, by the rotation and inverse-rotation operations of the display unit 11 by the predetermined angle as described with reference to FIGS. 10 and 11, columns ("a"-column, "ka"-column, and the like) in fifty Japanese characters (i.e., Japanese alphabets) are changed to one another and characters (e.g., "a," "i," "u," "e," and "0") in the selected column are scrolled and displayed such that the user can select it.

(2) Image Display Application

An application for displaying images captured by a camera, for example, can be applied to the display apparatus of the embodiment of the present technology. In this case, an image displayed in the display region may be scrolled and displayed not only in the circumferential direction of the display unit 11 but also in a rotational axis direction of the display apparatus. Note that, when selecting an image to be displayed, by the rotation and inverse rotation operations of the display unit 11 by the predetermined angle as described in FIGS. 10 and 11, groups of images (e.g., folders in which images are stored) are changed to one another and a plurality of images (e.g., thumbnail images) of the selected groups are scrolled and displayed such that the user can select it.

(3) TODO Management Application

An application for performing TODO management based on positional information can be applied to the display apparatus according to the embodiment of the present technology. A TODO list that is a list of what the user is to do (TODO) is created in advance and each TODO and positional information are stored in association with each other. When the user wearing the display apparatus comes closer to a point indicated by the stored positional information, the TODO associated with the positional information is displayed in the display region of the display unit 11. Note that when the user comes closer to the point indicated by the stored positional information, the user may be informed of it by sound or vibration.

(4) Advertisement Display Application

An application for displaying an advertisement of a shop or a company can be applied to the display apparatus according to the embodiment of the present technology. The advertisement is displayed in the region other than the display region if it is judged that the user has the viewing intention or in the entire periphery or part of the display unit 11 if it is judged that the user does not have the viewing intention in the information display processing described with reference to the flowchart of FIG. 4. Note that the displayed advertisement may be changed in accordance with a time zone or a position indicated by the positional information.

(5) Accessary Image Display Application

An application for displaying an image of a design imitating an accessory (accessory image) can be applied to the display apparatus according to the embodiment of the present technology. The accessory image is also displayed in the region other than the display region if it is judged that the user has the viewing intention or in the entire periphery or part of the display unit 11 if it is judged that the user does not have the viewing intention in the information display processing described with reference to the flowchart of FIG. 4. Although, by displaying the accessory image, the display apparatus can be made outstanding, the display apparatus may be prevented from being outstanding by displaying a skin color image instead of the accessory image.

[Display Apparatus According to Another Embodiment]

Figure 12:
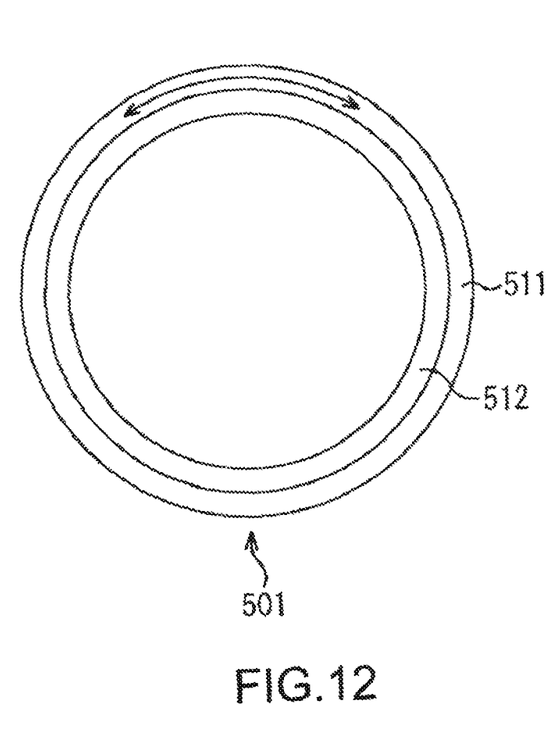
FIG. 12 is an outer appearance view showing a configuration example of a display apparatus according to another embodiment.

FIG. 12 is an outer appearance view showing a configuration example of a wristband type display apparatus according to another embodiment to which the present technology is applied.

A display apparatus 501 of FIG. 12 is configured by an outer peripheral portion 511 and an inner peripheral portion 512 that are, for example, made of resin and formed in a hollow cylindrical shape. The outer peripheral portion 511 is configured to be rotatable around the inner peripheral portion 512. In an outer peripheral surface of the outer peripheral portion 511, as in the display apparatus 1 of FIG. 1, over the entire periphery, the display unit 11 is disposed, the display unit 11 being able to be curved in a cylindrical shape with a surface being oriented outwards and to display information in a region of an entire periphery or part of the surface.

With such a configuration, even if the user wears the display apparatus 501 such that the inner peripheral portion 512 is not rotated around the wrist, the display unit 11 is rotatable around the wrist.

Although the display apparatus according to the embodiment of the present technology is mounted on the arm (wrist) as a part of the human body in the above description, it is not limited to be mounted on the wrist and may be mounted on an upper arm, femur, ankle, or the like.

By the way, the above-mentioned series of processing may be performed by hardware or may be performed by software. In the case where the above-mentioned series of processing is performed by software, programs configuring the software are installed from a network or a recording medium. The recording medium is configured by, for example, the memory serving as the storage unit 24 shown in FIG. 2.

Note that the embodiments of the present technology are not limited to the above-mentioned embodiments and various modifications can be made without departing from the gist of the present technology.

The present technology can take a cloud computing configuration in which a single function is shared with and processed by a plurality of apparatuses via a network.

For example, the display apparatus may be provided with a communication unit and the control unit 25 (control unit 121) and the storage unit 24 may be disposed in an external server such that the display apparatus and the server communicate with each other via a network. Thus, the display information may be displayed in the display region of the display unit 11.

Further, the steps described above referring to the flowcharts can be performed by a single apparatus or shared with and performed by a plurality of apparatuses.

In addition, if a single step includes a plurality of processes, the plurality of processes of the single step can be performed by a single apparatus or shared with and performed by a plurality of apparatuses.

It should be noted that the present technology may also take the following configurations.

(1) A display apparatus, including:
a display unit configured to be able to be curved in an almost cylindrical shape with a surface being oriented outwards and display information in a region of one of an entire periphery and a part of the surface;
a viewing intention detector configured to detect viewing intention of a user for the information displayed on the display unit, the user wearing the display unit on a part of a body;
a display region determiner configured to determine, according to the viewing intention of the user, a region of the display unit, which is viewable by the user, as a display region for displaying the information; and
a display control unit configured to control display of the information in the display region.

(2) The display apparatus according to (1), in which
the viewing intention detector is configured to detect an attitude of the user, to thereby detect the viewing intention of the user.

(3) The display apparatus according to (2), in which
the display region determiner is configured to determine, based on the attitude of the user, the region of the display unit, which is viewable by the user, as the display region.

(4) The display apparatus according to (1), in which
the viewing intention detector is configured to detect the viewing intention of the user according to an operation input made by the user.

(5) The display apparatus according to (1), in which
the display region determiner is configured to determine the display region according to an operation input with respect to a touch panel superimposed on the display unit.

(6) The display apparatus according to any one of (1) to (5), in which
the display control unit is configured to continuously scroll, in the display region, the information in a circumferential direction of the display unit.

(7) The display apparatus according to any one of (1) to (5), in which
the display control unit is configured to slide-display, in the display region, the information in predetermined time intervals.

(8) The display apparatus according to any one of (1) to (5), in which
the display control unit is configured to perform control to collectively display, in the display region, the information such that all the information is contained within the display region.

(9) The display apparatus according to any one of (1) to (5), in which
the display control unit is configured to perform control to scroll, in the display region, the information in a circumferential direction of the display unit according to an operation input with respect to a touch panel superimposed on the display unit.

(10) The display apparatus according to any one of (1) to (5), in which
the display control unit is configured to change, according to an action of the user, a method of displaying the information displayed on the display unit.

(11) The display apparatus according to (1), further including
a rotation detector configured to detect a rotation of the display unit in a circumferential direction, in which
the display region determiner is configured to move the display region according to an angle of rotation detected by the rotation detector, and
the display control unit is configured to control display of the information according to the movement of the display region.

(12) The display apparatus according to (11), in which
if the rotation detector detects a rotation by one turn from an initial state, the display control unit is configured to perform control to display a continuation of the information in the display region at a position of the initial state.

(13) The display apparatus according to (11), in which
if the rotation detector detects a rotation by a predetermined angle from an initial state and further detects an inverse rotation to the initial state, the display region determiner is configured to return the display region moved according to the rotation to a position of the initial state, and
the display control unit is configured to perform control to display a continuation of the information in the display region at the position of the initial state.

(14) The display apparatus according to any one of (1) to (13), in which the display control unit is configured to control display of one of a predetermined image and a predetermined color in a region other than the display region of the display unit.

(15) The display apparatus according to any one of (1) to (14), in which the display control unit is configured to control, if the user has no viewing intention for the information, display of one of a predetermined image and a predetermined color in one of an entire periphery and a part of the display unit.

(16) A display method for a display apparatus including a display unit configured to be able to be curved in an almost cylindrical shape with a surface being oriented outwards and display information in a region of one of an entire periphery and a part of the surface, the display method including: by the display apparatus, detecting viewing intention of a user for the information displayed on the display unit, the user wearing the display unit on a part of a body;

determining, according to the viewing intention of the user, a region of the display unit, which is viewable by the user, as a display region for displaying the information; and controlling display of the information in the display region.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus, comprising:
   a wearable display unit configured to display information in a first region of a surface of the wearable display unit; and
   a circuitry configured to:
      detect user viewing intention for the information displayed on the wearable display unit;
      determine a second region on the surface of the wearable display unit, based on the user viewing intention, wherein the second region is within a user field of view;
      determine angle information based on an output from at least one sensor, wherein the angle information indicates an angle of rotation of the wearable display unit;
      determine a third region on the surface of the wearable display unit based on the second region and the angle information; and
      control the wearable display unit to display the information in the third region.

2. The display apparatus according to claim 1, wherein the circuitry is further configured to detect the user viewing intention based on a user attitude.

3. The display apparatus according to claim 2, further comprising at least one of an acceleration sensor, a gyro sensor, or a geomagnetic sensor,
   wherein the circuitry is further configured to detect the user attitude based on an output of at least one of the acceleration sensor, the gyro sensor, or the geomagnetic sensor of the display apparatus.

4. The display apparatus according to claim 1, wherein the circuitry is further configured to determine a center position of the second region of the wearable display unit based on a touch operation on the wearable display unit.

5. The display apparatus according to claim 1, wherein the circuitry is further configured to determine the second region of the wearable display unit based on a user input operation on the wearable display unit.

6. The display apparatus according to claim 1, wherein the circuitry is further configured to continuously scroll the information in the third region in a circumferential direction of the wearable display unit.

7. The display apparatus according to claim 6, wherein the circuitry is further configured to continuously scroll the information in the third region in the circumferential direction of the wearable display unit based on a user input operation on a touch panel of the wearable display unit.

8. The display apparatus according to claim 1, wherein the circuitry is further configured to slide-display the information in the third region.

9. The display apparatus according to claim 1, wherein the circuitry is further configured to control collective display of the information in the third region.

10. The display apparatus according to claim 1, wherein the circuitry is further configured to change the display of the information on the wearable display unit based on a user action.

11. A method, comprising:
    displaying information in a first region of a surface of a wearable display unit;
    detecting user viewing intention for the information displayed on the wearable display unit;
    determining a second region on the surface of the wearable display unit, based on the user viewing intention, wherein the second region of the wearable display unit is within a user field of view;
    determining angle information based on an output from at least one sensor, wherein the angle information indicates an angle of rotation of the wearable display unit;
    determining a third region on the surface of the wearable display unit based on the second region and the angle information; and
    controlling the wearable display unit for displaying the information in the third region.

12. The display apparatus according to claim 1,
    wherein the angle information indicates the angle by which the wearable display unit is rotated from an initial state that corresponds to the second region, and
    wherein the circuitry is further configured to determine the third region based on the angle such that the third region is within the user field of view.

13. A non-transitory computer-readable medium having stored thereon, computer-executable instructions, which when executed by a computer, cause the computer to execute operations, the operations comprising:
    displaying information in a first region of a surface of a wearable display unit;
    detecting user viewing intention for the information displayed on the wearable display unit;
    determining a second region on the surface of the wearable display unit, based on the user viewing intention, wherein the second region is within a user field of view;
    determining angle information based on an output from at least one sensor, wherein the angle information indicates an angle of rotation of the wearable display unit;
    determining a third region on the surface of the wearable display unit based on the second region and the angle information; and
    controlling the wearable display unit for displaying the information in the third region.

* * * * *